US011525944B1

(12) United States Patent
Fleagle et al.

(10) Patent No.: US 11,525,944 B1
(45) Date of Patent: Dec. 13, 2022

(54) REDUCTION OF REFLECTIONS THROUGH RELATIVELY ANGLED TRANSMISSIVE SURFACES AND GRADIENT-INDEX LAYER

(71) Applicant: Lockheed Martin Corporation, Bethesda, MD (US)

(72) Inventors: Christopher B. Fleagle, Belle Isle, FL (US); Clara R. Baleine, Orlando, FL (US); Corey L. Bungay, Ocoee, FL (US); Erwan A. P. Baleine, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 575 days.

(21) Appl. No.: 16/686,374

(22) Filed: Nov. 18, 2019

(51) Int. Cl.
*G02B 1/11* (2015.01)
*G02B 1/115* (2015.01)

(52) U.S. Cl.
CPC ............... *G02B 1/11* (2013.01); *G02B 1/115* (2013.01)

(58) Field of Classification Search
CPC .............................................. G02B 1/11–118
See application file for complete search history.

(56) References Cited

U.S. PATENT DOCUMENTS

| 4,843,565 | A | * | 6/1989 | Rose | ........................ | G01S 11/12 356/4.06 |
| 9,340,446 | B1 | | 5/2016 | Baleine et al. | | |
| 9,772,255 | B1 | | 9/2017 | Tener et al. | | |
| 2011/0128470 | A1 | | 6/2011 | Yorita et al. | | |
| 2014/0085729 | A1 | | 3/2014 | Uchiyama et al. | | |
| 2019/0157620 | A1 | | 5/2019 | Forrest et al. | | |

FOREIGN PATENT DOCUMENTS

| JP | 2010271455 A | 12/2010 |
| JP | 2014235318 A | 12/2014 |

OTHER PUBLICATIONS

International Search Report and Written Opinion for International Patent Application No. PCT/US2020/057660, dated Feb. 22, 2021, 10 pages.

Nag, N., et al., "Alon® Grin Optics for Visible-MWIR Applications," Proceedings of the SPIE, vol. 9822, May 2016, SPIE, 9 pages.

* cited by examiner

*Primary Examiner* — Ryan S Dunning
(74) *Attorney, Agent, or Firm* — Terry M. Sanks, Esquire; Beusse Sanks, PLLC

(57) ABSTRACT

Disclosed are optical systems that vary the refractive index of at least one relatively angled transmissive surface to reduce reflections. Embodiments include at least one optical component with relatively angled surface portions that are transmissive to electromagnetic radiation (EMR). In certain embodiments, an electrically conductive layer reflective to EMR and an anti-reflective coating are proximate the optical component. The anti-reflective coating includes a gradient-index (GRIN) layer with an index of refraction that varies across a length to increase propagation of EMR at a predetermined angle of incidence to prevent reflection of the EMR between the angled transmissive surfaces.

20 Claims, 12 Drawing Sheets

REDUCTION OF REFLECTIONS THROUGH RELATIVELY ANGLED TRANSMISSIVE SURFACES AND GRADIENT-INDEX LAYER

TECHNICAL FIELD

The embodiments relate to optical systems and, in particular, to varying the refractive index of at least one relatively angled transmissive surface to reduce reflections (e.g., light).

BACKGROUND

Optical components (e.g., segmented and/or conformal windows) may be used on a vehicle (e.g., aircraft), to increase aerodynamic drag, to expand a field of regard, and/or to adopt surface contours and/or electrically conductive features to increase difficulty of detection by radar systems. In particular, surface contours may reduce a radar cross section of the vehicle to make the vehicle more difficult to detect by a radar system (e.g., detectable as a small object or not at all). Further, certain applications involve propagation of electromagnetic radiation through relatively angled transmissive surfaces of one or more optical components (e.g., angled for airstream management). However, optical components reflect electromagnetic radiation (EMR) at particular angles of incidence.

Due to the adjacency of these relatively angled transmissive surfaces (and/or the reflective electrically conductive features), a portion of the EMR may reflect from one of these relatively angled transmissive surfaces through the other. Such reflections degrade transmission and may be particularly problematic where the reflected EMR are not eye safe (e.g., moderate and/or high powered lasers) and/or present a safety risk to users. Accordingly, in such applications, minimizing reflections increases the EMR that reaches the intended target and reduces potentially dangerous reflections (e.g., light energy).

Anti-reflective (AR) coatings may be applied to an optical component to reduce surface reflectivity. However, such coatings typically have a uniform refractive index across the entire surface of the component which is uniform and not optimized for specific incident angles, and is instead configured for the entire range of incident angles of the optical component. Where the angle of incidence through an optical component is known, a uniform refractive index is not tailored or optimized for the various angles of incidence from the EMR source point.

SUMMARY

The embodiments relate to optical systems and, in particular, to varying the refractive index of at least one relatively angled transmissive surface to reduce reflections (e.g., laser energy). The embodiments include at least one optical component with relatively angled surface portions that are transmissive to electromagnetic radiation (EMR). In certain embodiments, an electrically conductive layer reflective to EMR and an anti-reflective coating are proximate the optical component. The anti-reflective coating includes a gradient-index (GRIN) layer with an index of refraction that varies across at least one length to increase propagation of EMR at a predetermined angle of incidence to prevent reflection of the EMR between the angled transmissive surfaces.

In one embodiment, an optical system includes at least one optical component with a first surface portion and a second surface portion angled relative to the first surface portion at a non-zero angle. The at least one optical component is transmissive to electromagnetic radiation (EMR). The optical system further includes at least one reflective layer proximate the first surface portion, the at least one reflective layer being reflective to EMR. The optical system further includes at least one anti-reflective coating proximate the first surface portion, the at least one anti-reflective coating including a gradient-index (GRIN) layer with differing indices of refraction. Each index of refraction is configured to increase propagation of the EMR at a predetermined angle of incidence to prevent reflection of the EMR from the first surface portion to the second surface portion.

In another embodiment, a method of making an optical system includes forming at least one optical component with a first surface portion, the at least one optical component being transmissive to electromagnetic radiation (EMR). The method further includes coupling at least one reflective layer proximate the first surface portion. The at least one reflective layer is reflective to EMR. The method further includes coupling at least one anti-reflective coating proximate the first surface portion. The at least one anti-reflective coating includes a gradient-index (GRIN) layer with differing indices of refraction. Each index of refraction is configured to increase propagation of the EMR at a predetermined angle of incidence to prevent reflection of the EMR from the first surface portion to a second surface portion.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
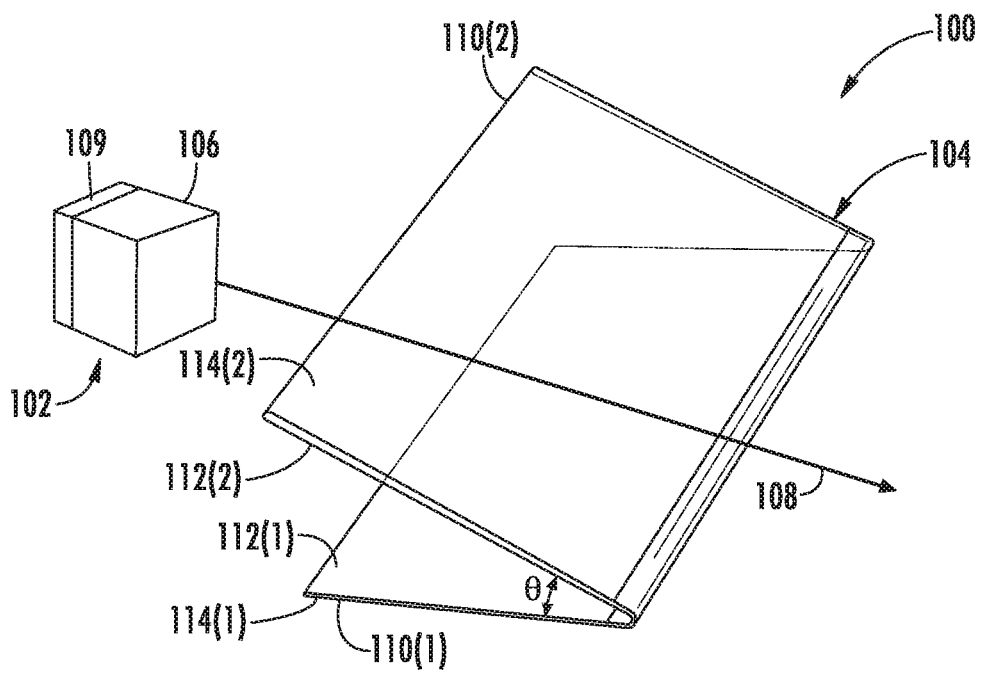
FIG. 1A is a perspective view of an optical system according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first layer" and "second layer," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The phrase "surface" as used herein refers to an outermost portion of an item, and includes a thickness of the outermost portion of the item. The precise thickness is generally not relevant to the embodiments, unless otherwise discussed herein. For example, a layer of material has a surface which includes the outermost portion of the layer of material as well as some depth into the layer of material, and the depth may be relatively shallow, or may extend substantially into the layer of material. The sub-wavelength openings discussed herein are formed in the surface, but whether the depth of the sub-wavelength openings extends past the depth of the surface or not is generally not relevant to the embodiments.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The use herein of "proximate" means at, next to, or near.

The embodiments include the generation of gradient-index (GRIN) optics. Mechanisms for generating GRIN optics in a surface of a material are disclosed, for example, in U.S. Pat. Nos. 9,340,446 and 9,772,255, the contents of which are hereby incorporated herein by reference.

The embodiments relate to optical systems and, in particular, to varying the refractive index of at least one relatively angled transmissive surface to reduce light reflections (e.g., laser energy). The embodiments include at least one optical component with relatively angled surface portions that are transmissive to electromagnetic radiation (EMR). In certain embodiments, an electrically conductive layer reflective to EMR and an anti-reflective coating are proximate the optical component. The anti-reflective coating includes a gradient-index (GRIN) layer with an index of refraction that varies across at least one length to increase propagation of EMR at a predetermined angle of incidence (AOI) to prevent reflection of the EMR between the angled transmissive surfaces.

The embodiments include optical components and/or anti-reflective (AR) coatings with sub-wavelength openings in the surface of the optical component that change a refractive index at the air/surface interface to reduce reflectance and increase transmittance through the optical component. The embodiments have applicability with optical components that utilize an optical substrate without anti-reflective (AR) materials, as well as optical components that utilize one or more layers of AR materials on the optical substrate. In certain embodiments, the optical components include a reflective layer and/or blocking layer insulating the reflective layer to block any reflections from the reflective layer. The optical components and/or AR coatings are optimized across a surface for varying predetermined AOIs (and/or a predetermined range of AOIs).

Snell's law describes the relationship between the angle of incidence of light travelling in a first medium having a first index of refraction (sometimes referred to herein as a refractive index) and the angle of refraction of the light in a second medium having a second index of refraction, as the light travels from the first medium to the second medium. Snell's law can be described by the following equation:

$$n_1 \sin \theta_1 = n_2 \sin \theta_2$$

where $\theta_1$ is the angle of incidence, $\theta_2$ is the angle of refraction, $n_1$ is the index of refraction of the first medium, and $n_2$ is the index of refraction of the second medium. Note that the index of refraction of a material varies depending on the wavelength of the light.

Fresnel equations describe the behavior of light as light moves from a first medium that has a first index of refraction to a second medium that has a second, different, index of refraction. The behavior includes characteristics of reflectance (reflection of the light off the surface of the second medium) and transmission (refraction of the light into the second medium). The reflectance of light can differ depending on whether the light is s-polarized light or p-polarized light. The reflectance of s-polarized light ($R_s$) can be determined in accordance with the following equation:

$$R_s = \left| \frac{n_1 \cos\theta_i - n_2 \cos\theta_t}{n_1 \cos\theta_i + n_2 \cos\theta_t} \right|^2$$

wherein $\theta_i$ is the angle of incidence of the s-polarized light, $\theta_t$ is the angle of refraction of the s-polarized light, $n_1$ is the index of refraction of the first medium, and $n_2$ is the index of refraction of the second medium.

The reflectance of p-polarized light ($R_p$) can be determined in accordance with the following equation:

$$R_p = \left| \frac{n_1 \cos\theta_t - n_2 \cos\theta_i}{n_1 \cos\theta_t + n_2 \cos\theta_i} \right|^2$$

wherein $\theta_i$ is the angle of incidence of the p-polarized light, $\theta_t$ is the angle of refraction of the p-polarized light, $n_1$ is the index of refraction of the first medium, and $n_2$ is the index of refraction of the second medium.

Where the incident light is unpolarized, the reflectance can be determined in accordance with the following formula:

$$R = \frac{1}{2}(R_s + R_p)$$

The Fresnel equations thus identify relationships between indices of refraction of the two mediums, angles of incidence of the light, and the quantity of reflected light versus transmitted light. As noted above, the index of refraction of a material varies depending on the wavelength of the light. Thus, in accordance with Snell's law and the Fresnel equations, altering an index of refraction of a material can alter the transmission characteristics of the material.

In accordance with the Fresnel equations, a same wavelength of light striking different surface portions of a material with a constant refractive index at different angles of incidence will result in different ratios of reflected to transmitted light. Consequently, conventional AR coatings are configured as an average of all incident angles of light striking the AR coating, and a compromise (average) in performance is accepted for light striking the AR coating at higher or lower angles. Greatly differing percentages of transmitted light from different angles of incidence is undesirable in many applications, and it would be preferable in many applications if larger percentages of transmitted light could be obtained at greater angles of incidence, such as, by way of non-limiting example, a 70 degree angle of incidence. In particular, increasing transmission decreases reflectance. However, utilizing an AR coating that has a refractive index optimized for light at, for example, a 70 degree angle of incidence would be less than optimal for other angles of incidence. Moreover, relatively even transmission across a field of view is preferable to greatly differing amounts of transmission based on the angle of incidence of the impinging light.

A pattern of sub-wavelength openings at a particular filling fraction defined by a diameter D of the sub-wavelength openings and a distance L between the sub-wavelength openings formed in the surface of a medium can alter the refractive index of the medium. The phrase "sub-wavelength" refers to opening diameters less than the wavelengths at issue. For example, the examples herein are discussed in the context of wavelengths in the 3 micrometer (μm) (i.e., 3000 nanometers (nm)) to 5 μm (i.e., 5000 nm) range, and thus, sub-wavelength openings refer to openings having a diameter less than 3000 nm. In particular, a desired refractive index $n_{eff}$ can be formed in a material by solving for D and L in accordance with the following formula for a hexagonal pattern of sub-wavelength openings:

$$n_{eff} = n_{substrate} + \frac{\pi D^2}{2\sqrt{3} \cdot L^2}(n_{air} - n_{substrate})$$

wherein $n_{air}$ is the refractive index of air (assuming air is the first medium), $n_{substrate}$ is the refractive index of the second medium, D is a diameter of the sub-wavelength openings, and L is a pitch that identifies a distance between the center of the sub-wavelength openings.

Figure 1B:
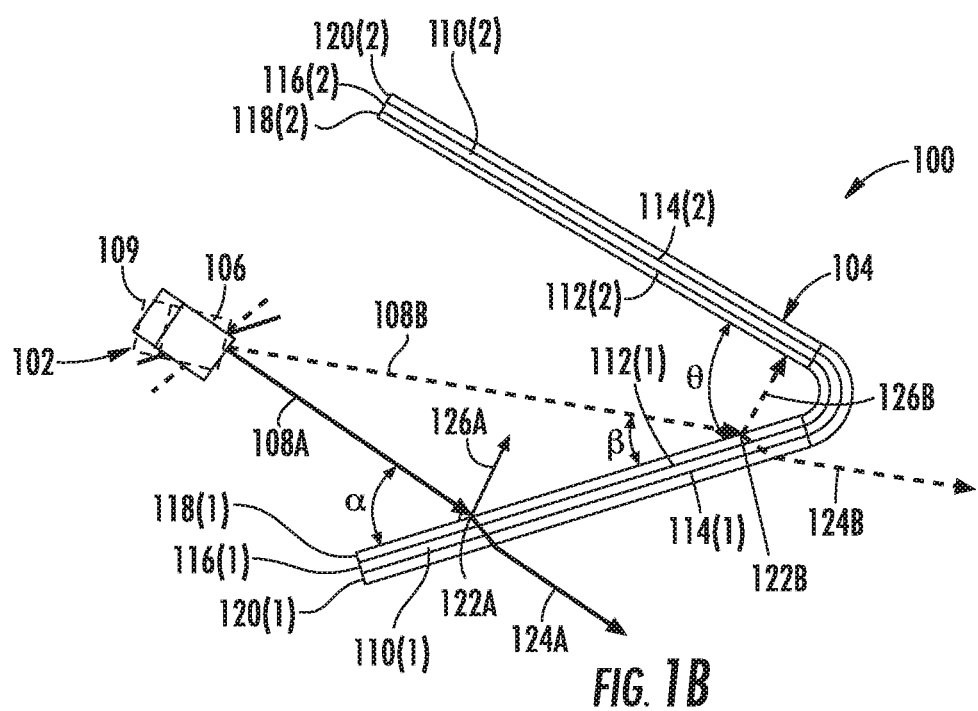
FIG. 1B is a side view of the optical system of FIG. 1 illustrating propagation and reflection of main electromagnetic radiation (EMR) beams.

FIGS. 1A-1B are views of an optical system 100 according to one embodiment. The optical system 100 includes an electromagnetic radiation (EMR) assembly 102 and an optical assembly 104. In certain embodiments, the EMR assembly 102 includes an EMR source 106 configured to generate EMR emissions 108 toward the optical assembly 104 and optionally a gimbal 109 to direct the EMR emissions 108 through the optical assembly 104.

The EMR source 106 may be any of a variety of types configured to emit any of a variety of types of EMR emissions, such as laser radiation, infrared radiation, ultraviolet, visible (light), etc. The EMR emissions 108 may propagate as a beam, a cylinder, a cone, etc. The embodiments are generally designed for use in a particular bandwidth of light, referred to herein as the selected band of EMR, and could include, by way of non-limiting example, short-wave IR, mid-wave IR, long-wave IR, ultraviolet, visible light, or the like. Such bands may include, but are not limited to, a band of wavelengths from 30 μm to 1 mm, from 3 μm to 30 μm, from 700 nm to 3 μm, from 400 nm to 700 nm, from 200 nm to 400 nm, from 1.4 μm to 3 μm, from 3 μm to 8 μm, from 8 μm to 15 μm, and/or from 15 μm to 1000 μm.

In certain embodiments, the optical assembly 104 includes a first optical component 110(1) and a second optical component 110(2), each of the first optical component 110(1) and second optical component 110(2) being transmissive to EMR emissions 108 from the EMR source 106. The first optical component 110(1) includes a first inner transmissive surface portion 112(1) and a first outer transmissive surface portion 114(1) opposite thereto. The term "portion" as used herein refers to part or the entirety thereof. The second optical component 110(2) includes a second inner transmissive surface portion 112(2) and a second outer transmissive surface portion 114(2) opposite thereto. The first inner transmissive surface portion 112(1) is angled relative to the second inner transmissive surface portion 112(2) at a non-zero angle θ, and the first outer transmissive surface portion 114(1) is angled relative to the second outer transmissive surface portion 114(2) at a non-zero angle G. The non-planar orientation of the first optical component 110(1) and the second optical component 110(2) are non-planar, such as may be encountered in a window in an aircraft.

Referring to FIG. 1B, the first optical component 110(1) includes a first optical substrate 116(1) with a first inner overlay 118(1) at the first inner transmissive surface portion 112(1) and/or a first outer overlay 120(1) at the first outer transmissive surface portion 114(1). The second optical component 110(2) includes a second optical substrate 116(2) with a second inner overlay 118(2) at the first inner transmissive surface portion 112(2) and/or a first outer overlay 120(2) at the first outer transmissive surface portion 114(2).

In certain embodiments, the EMR source 106 is mounted to a gimbal 109 which moves the aim of the EMR source 106 with respect to the optical assembly 104. The gimbal 109 physically moves (e.g., rotates) the EMR source 106. In other embodiments, reflectors may be used to switch the aim of the EMR emission 108 relative to the optical assembly 104.

Accordingly, the EMR source 106 may be aimed at the optical assembly 104 at a variety of different angles and/or locations. For example, the EMR source 106 emits a first EMR emission 108A at the first optical component 110(1) at a first location 122A at a first angle of incidence (AOI) α. A first transmitted portion 124A of the first EMR emission 108A transmits through the first optical component 110(1). In certain embodiments, a first reflected portion 126A of the first EMR emission 108A may be reflected from the first inner transmissive surface portion 112(1) of the first optical component 110(1) toward the second inner transmissive surface portion 112(2) of the second optical component 110(2). As a further example, the EMR source 106 emits a second EMR emission 108B at the first optical component 110(1) at a second location 122B at a second AOI β. A second transmitted portion 124B of the second EMR emission 108B transmits through the first optical component 110(1). In certain embodiments, a second reflected portion 126B of the second EMR emission 108B may be reflected from the first inner transmissive surface portion 112(1) of the first optical component 110(1) toward the second inner transmissive surface portion 112(2) of the second optical component 110(2).

In certain embodiments, the first AOI α at the first location 122A is different from the second AOI β at the second location 122B. The first optical component 110(1) optimizes the index of refraction at the first location 122A based on the predetermined first AOI α, wavelength of EMR emissions, material of the first optical substrate 116(1), etc., and optimizes the index of refraction at the second location 122B based on the predetermined second AOI β, wavelength of EMR emissions, material of the second optical substrate 116(2), etc.

Although not illustrated, the optical system 100 may also include an optical system that includes one or more lenses and/or one or more reflectors positioned in the light path between the EMR source 106 and the optical assembly 104 to focus or otherwise manipulate the EMR emissions 108 for delivery through the optical assembly 104.

Figure 2A:
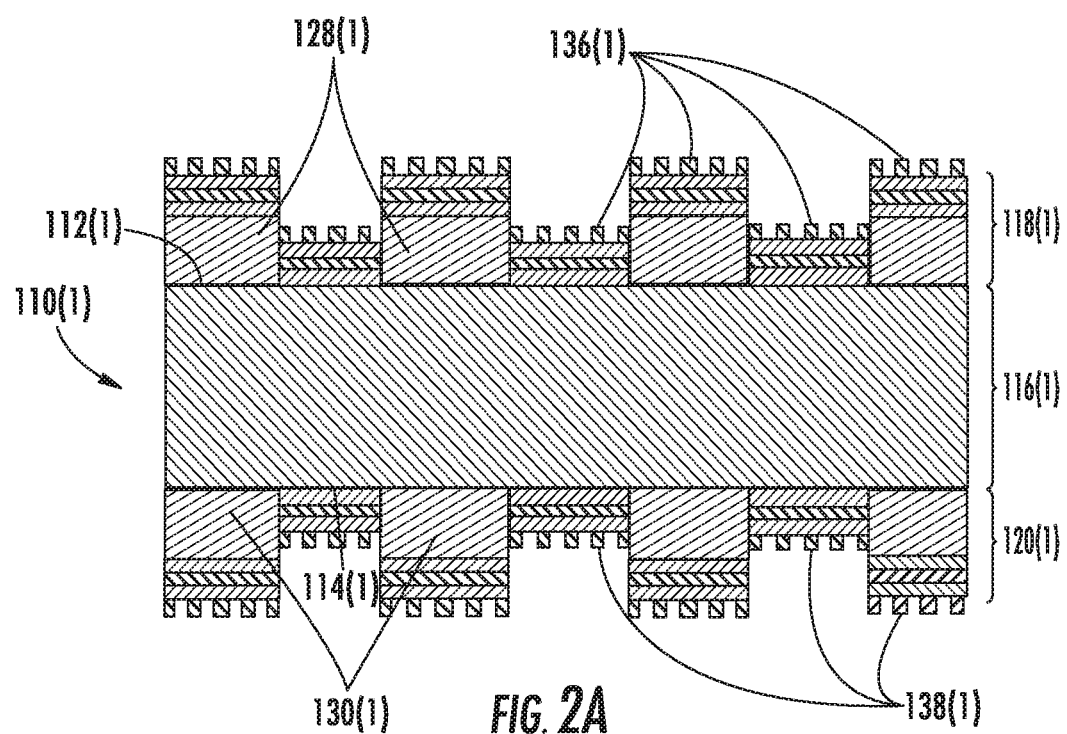
FIG. 2A is a side view of an optical component with a reflective layer and an anti-reflective coating applied to both sides of the optical component.

FIG. 2A is a side view of a first optical component 110(1) with the optical substrate 116(1) having a first inner overlay 118(1) and a first outer overlay 120(1). The optical substrate 116(1) may include any suitable optical material, and may be selected based on a particular wavelength, or band of wavelengths for which the optical system 100 is designed. In this particular example, the optical substrate 116(1) comprises silicon, but the embodiments are not limited to silicon and have applicability to any optical substrate, including, by way of non-limiting example, sapphire, germanium, Cleartran™ (ZnS), zinc selenide (ZnSe), chalcogenide glasses (e.g., AMTIR-4, AMTIR-5, IRG24), and the like.

However, in certain embodiments the first optical component 110(1) may include only one of the first inner overlay 118(1) and/or the first outer overlay 120(1). Although discussion will be directed to the first optical component 110(1), it is noted that the features discussed may also be applied to the second optical component 110(2).

As noted above, the first optical component 110(1) includes the optical substrate 116(1) having a first inner transmissive surface portion 112(1) and a first outer transmissive surface portion 114(1). In certain embodiments, a first inner reflective layer 128(1) is positioned proximate (e.g., attached to) the first inner transmissive surface portion 112(1) and/or a first outer reflective layer 130(1) is positioned proximate (e.g., attached to) the first outer transmissive surface portion 114(1). The reflective layers 128(1), 130(1) are reflective to the EMR emissions 108 from the EMR source 104. In certain embodiments, the reflective layers 128(1), 130(1) may be electrically conductive, such as to avoid detection by a radar system.

Figure 2B:
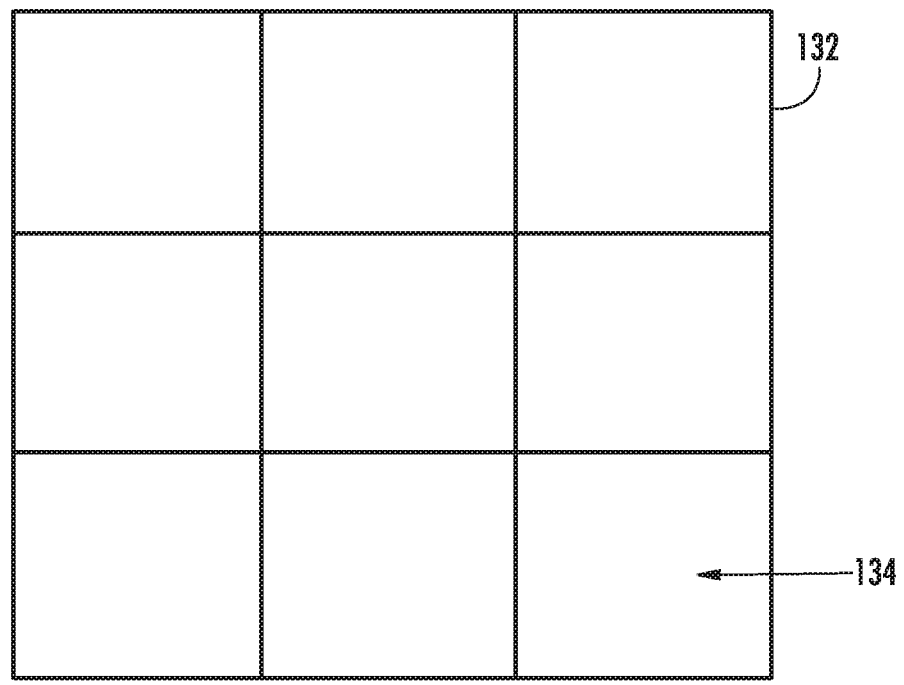
FIG. 2B is a view of the reflective layer of FIGS. 1A-2A forming an electrically conductive grid.

Referring to FIG. 2B, each of the reflective layers 128(1), 130(1) may be a grid 132 (e.g., electrically conductive grid) with apertures 134 defined therebetween. The apertures 134 are formed for transmission of the EMR emissions 108 through the optical substrate 116(1) positioned within the apertures 134. In certain embodiments, the electrically conductive grid 132 may be configured to reduce detection by a radar system.

Referring back to FIG. 2A, in certain embodiments, a first inner anti-reflective (AR) coating 136(1) is positioned proximate (e.g., attached to) the first inner transmissive surface portion 112(1) and/or first inner reflective layer 128(1). In certain embodiments, a first outer AR coating 138(1) is positioned proximate (e.g., attached to) the first outer transmissive surface portion 114(1) and/or first outer reflective layer 130(1). At least one of the AR coatings 136(1), 138(1) include a gradient-index (GRIN) layer with differing indices of refraction. As noted above, in certain embodiments, the AR coating may be positioned proximate (e.g., attached to) the second surface portion (e.g., second inner transmissive surface portion (112(2) and/or second outer transmissive surface portion 114(2)). Each index of refraction is configured to increase propagation of the EMR emissions 108 at a predetermined angle of incidence to prevent reflection of the EMR emissions 108 from the first surface portion (e.g., first inner transmissive surface portion 112(1) and/or first outer transmissive surface portion 114(1)) to the second surface portion (e.g., second inner transmissive surface portion 112(2) and/or second outer transmissive surface portion 114(2)).

Figure 3A:
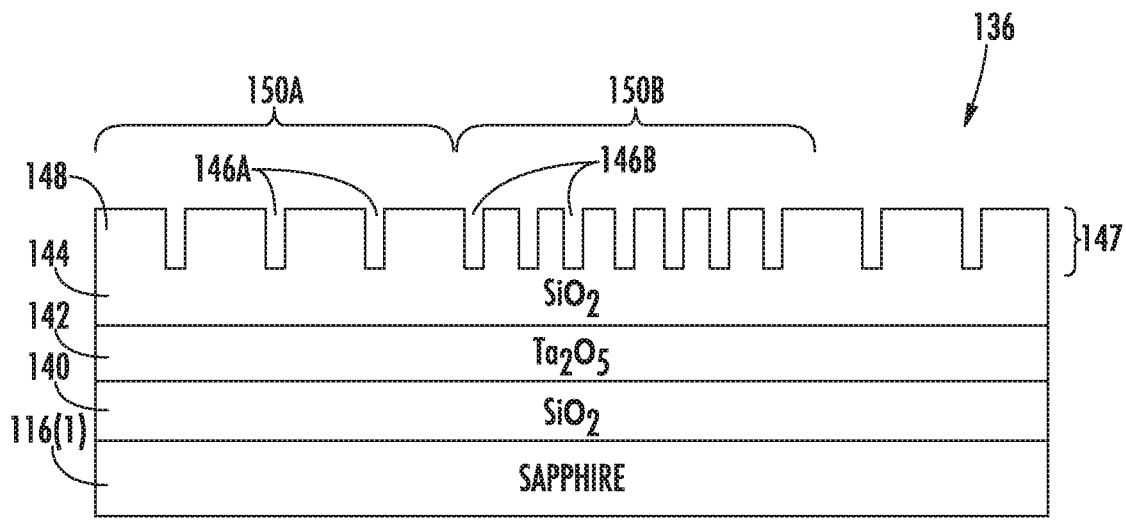
FIG. 3A is a block diagram of an anti-reflective coating with differing refractive indices.
Figure 3B:
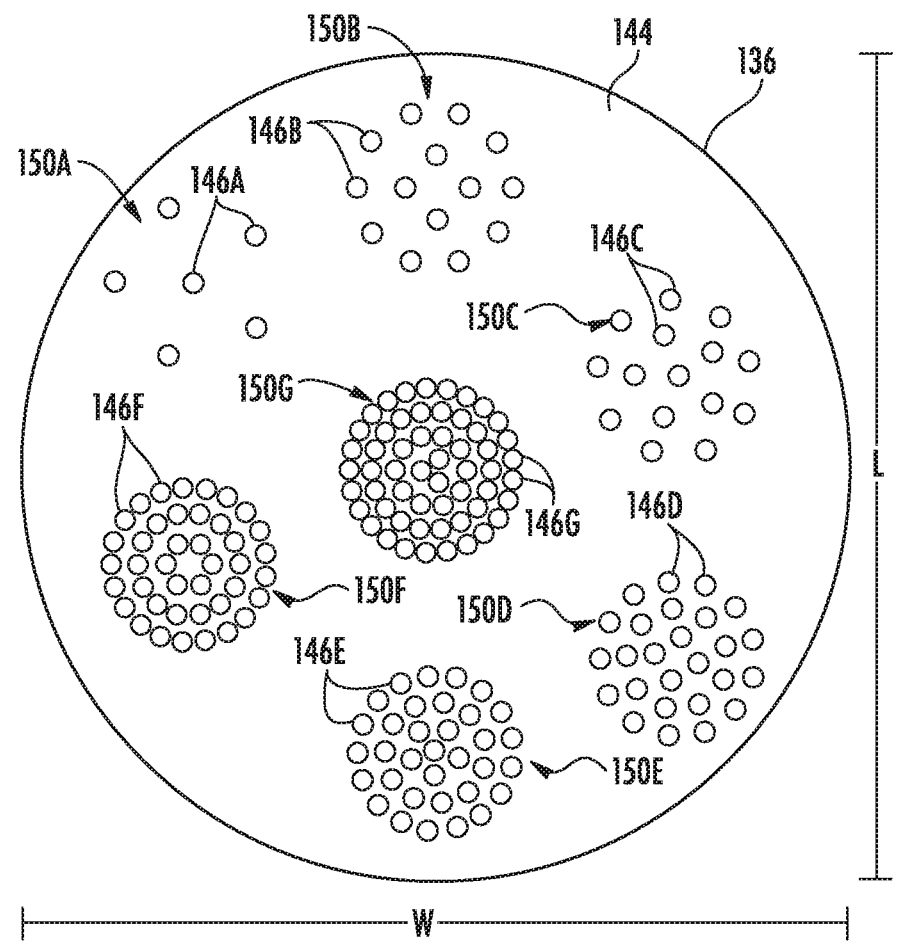
FIG. 3B is a top view of the anti-reflective coating having differing refractive indices.

FIGS. 3A-3B are diagrams of an anti-reflective coating 136 with differing refractive indices. The features discussed with respect to the inner AR coating 136(1) are also applicable to any AR coatings discussed herein. Further, the features discussed with respect to the first optical component 110(1) apply to any optical component discussed herein.

The first optical component 110(1) includes the optical substrate 116(1), which in this example comprises sapphire, a first layer of AR material 140, a second layer of AR material 142, and a third layer of AR material 144. The first layer of AR material 140 includes a low-index material, silicon dioxide; the second layer of AR material 142 includes a high-index material, tantalum pentoxide; and the third layer of AR material 144 includes a low-index material, silicon dioxide. A plurality of sub-wavelength openings 146A, 146B (referred to generally as openings 146) are formed at a filling fraction in the third layer of AR material 144 that alters a native refractive index of a surface 148 to a first desired refractive index. The plurality of sub-wavelength openings 146 are referred to as layer 147 below, but are formed in the third layer of AR material 144.

As an example, in certain embodiments, a first portion 150A of the optical component 110(1) includes openings 146A at a first filling fraction and a second portion 150B includes openings 146B at a second filling fraction. In other words, the third layer of AR material 144 includes the first portion 150A that forms a plurality of first sub-wavelength openings 146A at a first filling fraction that alters a native refractive index of the surface of the third layer of AR material 144 to a first desired refractive index. The third layer of AR material 144 also has the second portion 150B that forms a plurality of second sub-wavelength openings 146B at a second filling fraction that alters the native refractive index of the third layer of AR material 144 to a second desired refractive index. In this example, the diameter and/or depth of the first sub-wavelength openings 146A and the second sub-wavelength openings 146B may be identical; however, the pitch between the first sub-wavelength openings 146A differs from the pitch between the second sub-wavelength openings 146B. In other embodiments, the diameter and/or depth may vary as well.

Note that in other embodiments, particular low-index AR material layers and high-index AR material layers may be selected based on particular wavelength bands of interest. Moreover, while three AR material layers are illustrated herein, fewer or greater than three AR material layers may be utilized.

As an example, in one embodiment, Table 1 identifies the refractive indices and thicknesses of each layer.

TABLE 1

| Material | Function | Thickness (μm) | Refractive Index at 1 micrometer |
|---|---|---|---|
| SiO₂ | GRIN layer | 1.7949 | Varies |
| SiO₂ | L-index | 0.3681 | 1.45 |
| Ta₂O₅ | H-index | 0.0355 | 2.09 |
| SiO₂ | L-index | 0.0683 | 1.45 |
| Sapphire | Substrate | 5000 | 1.76 |

As a further example, Table 2 illustrates optimizing a GRIN segment depending on a predetermined AOI for that segment. In this way, the first optical component 110(1) can be segmented (e.g., pixelated) into subsections based on a predetermined AOI (or based on a predetermined range of AOIs).

TABLE 2

| AOI (deg) | Optimized GRIN layer Refractive Index at 1 micrometer |
|---|---|
| 0 | 1.38 |
| 5 | 1.4 |
| 10 | 1.4 |
| 15 | 1.4 |
| 20 | 1.42 |
| 25 | 1.45 |
| 30 | 1.2 |
| 35 | 1.2 |
| 40 | 1.25 |
| 45 | 1.28 |
| 50 | 1.32 |
| 55 | 1.37 |
| 60 | 1.2 |
| 65 | 1.2 |
| 70 | 1.2 |

FIG. 3B is a top view of the anti-reflective coating 136 of an optical component 110(1) having differing refractive indices. As shown, the anti-reflective coating 136 may have varying fill fractions and resulting indices of refraction across a length L and/or width W of the optical component 110(1). In particular, each of a plurality of portions 150A-150G include a plurality of sub-wavelength openings 146A-146G, respectively, formed in the surface to alter the native refractive index of the top layer of AR material 144 to differing desired refractive indices. In one embodiment, the sub-wavelength openings 146 are formed by directing a beam of energy at the surface to imprint a mask of the sub-wavelength openings 146, although the embodiments are not limited to any particular mechanism of imprinting a mask. The beam of energy may comprise, by way of non-limiting example, an ion beam, e-beam lithography, or a laser beam. A subsequent chemical or physical etching processing step may then be performed to form the sub-wavelength openings 146 in accordance with the mask. In certain embodiments, the sub-wavelength openings 146 are formed by atomic layer deposition (ALD) or similar techniques.

Figure 4:
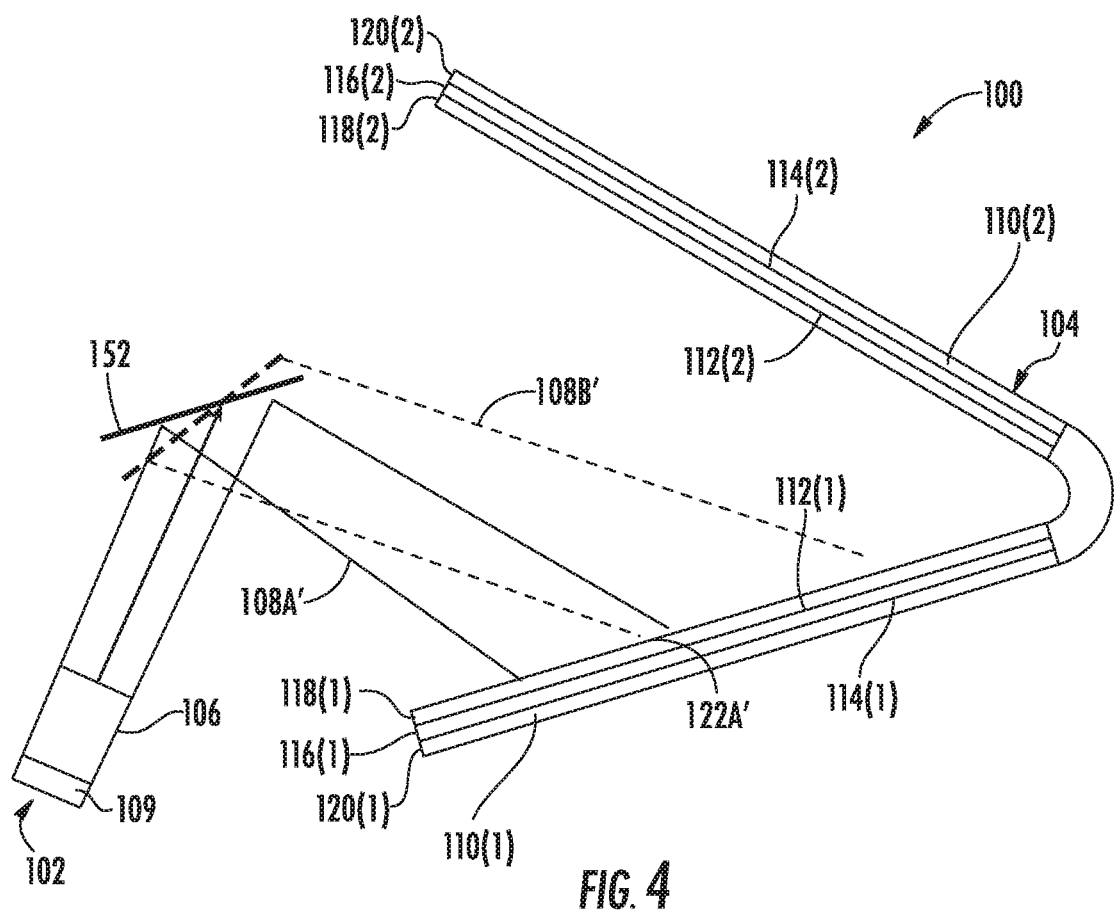
FIG. 4 is a side view of the optical system of FIGS. 1A-1B illustrating propagation and reflection of main EMR beams propagated in a cylinder via an intermediate reflector.

FIG. 4 is a side view of the optical system of FIGS. 1A-1B illustrating propagation and reflection of main EMR beams 108A', 108B' propagated in a cylinder via an intermediate reflector 152. The intermediate reflector 152 may rotated to direct the EMR beams 108A', 108B', particularly in situations where the EMR source 106 is stationary.

As noted above, the EMR emissions 108 may be a beam, a cylinder, and/or a cone, etc. As shown, the EMR emissions 108 have a width (e.g., 1 inch), such that any one location 122A' on the optical component 110(1) may experience more than one AOI. For example, there is an overlap at location 122A' between the first EMR beam 108A' at a first angle of incidence and the second EMR beam 108B' at a second angle of incidence. In such a case, the index of refraction at that location 122A' may be optimized as an average of the AOIs experienced at that location. In other embodiments, the index of refraction may be optimized by weighting the anticipated frequencies of the AOIs at that location 122A'. For example, if a specification location 122A' expects to experience a 40 degree AOI for approximately 50% of the time, but a 10 degree AOI for approximately 5% of the time, then those values may not be simply averaged, but weighted by frequency.

Figure 5A:
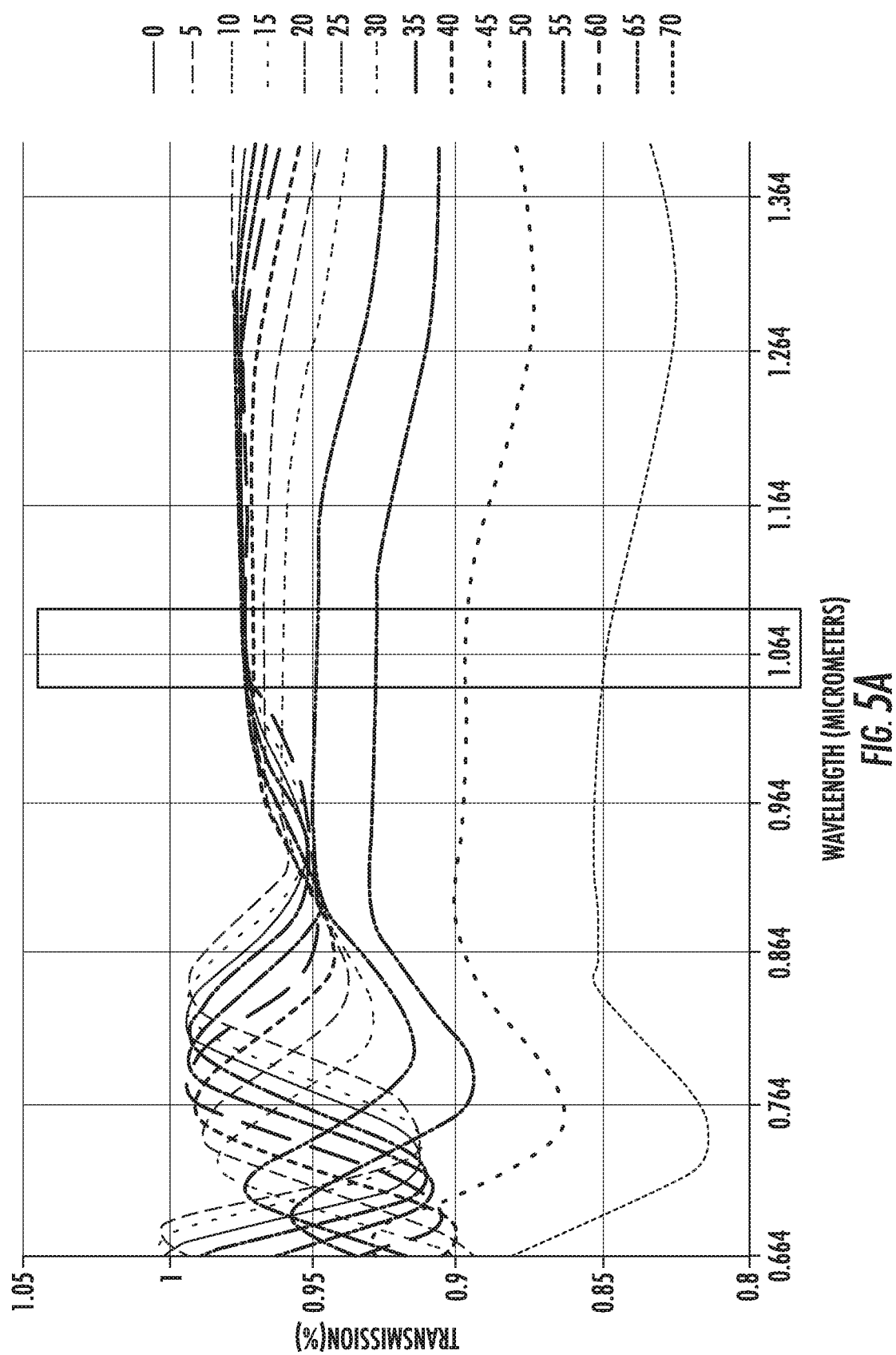
FIG. 5A is a graph illustrating transmission as a function of wavelength for an anti-reflective coating with a uniform index of refraction.

FIG. 5A is a graph illustrating transmission as a function of wavelength for an anti-reflective coating of an optical component with a uniform index of refraction. As shown, for any particular wavelength of EMR emissions, there are large differences in transmission percentage depending on the angle of incidence of the EMR emissions with the optical component. For example, for a 1.064 micrometer wavelength at a 70 degree angle of incidence, the transmission percentage drops from a maximum of 97% to less than 85%. Traditional dielectric AR coating stacks are based on interference phenomena, which means that the transmission spectra are going to shift as a function of AOI, because there is an apparent thickness change for different AOIs, given a specific design (i.e., materials and thicknesses of the coating layers are constant throughout the window). In other words, for a material with constant thickness, a wavelength entering at a normal angle has a shorter travel distance through the material then entering at a non-normal angle.

Figure 5B:
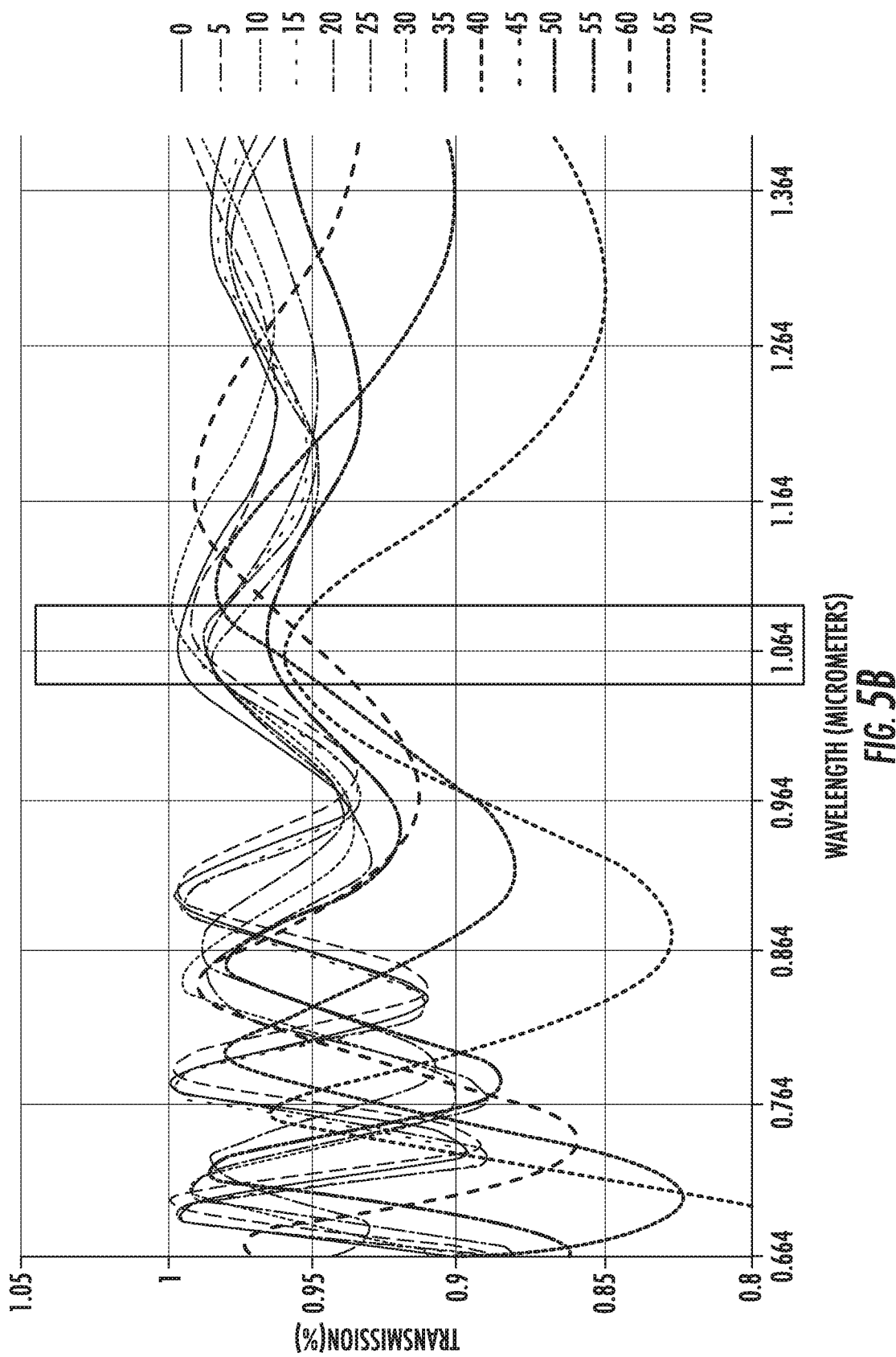
FIG. 5B is a graph illustrating transmission as a function of wavelength for an anti-reflective coating with differing indices of refraction.

FIG. 5B is a graph illustrating transmission as a function of wavelength for an optical component with an anti-reflective coating as described above with differing indices of refraction, as discussed above. For example, an optical component optimized for a 1.064 wavelength EMR emission has much better transmission performance as compared to an optical component with a uniform index of refraction, as in FIG. 5A. For example, for a 1.064 micrometer wavelength at a 70 degree angle of incidence, the transmission percentage drops from a maximum of 100% to 97%. Not only is the maximum transmission greater, but the drop is less. The GRIN layer provides additional degrees of freedom to maintain the resonance at a particular wavelength for a constant material and thickness of the coating layers, by adjusting the filling fraction of the GRIN layer (i.e., refractive index) to compensate for shifts due to apparent thickness changes for different AOIs.

Figure 5C:
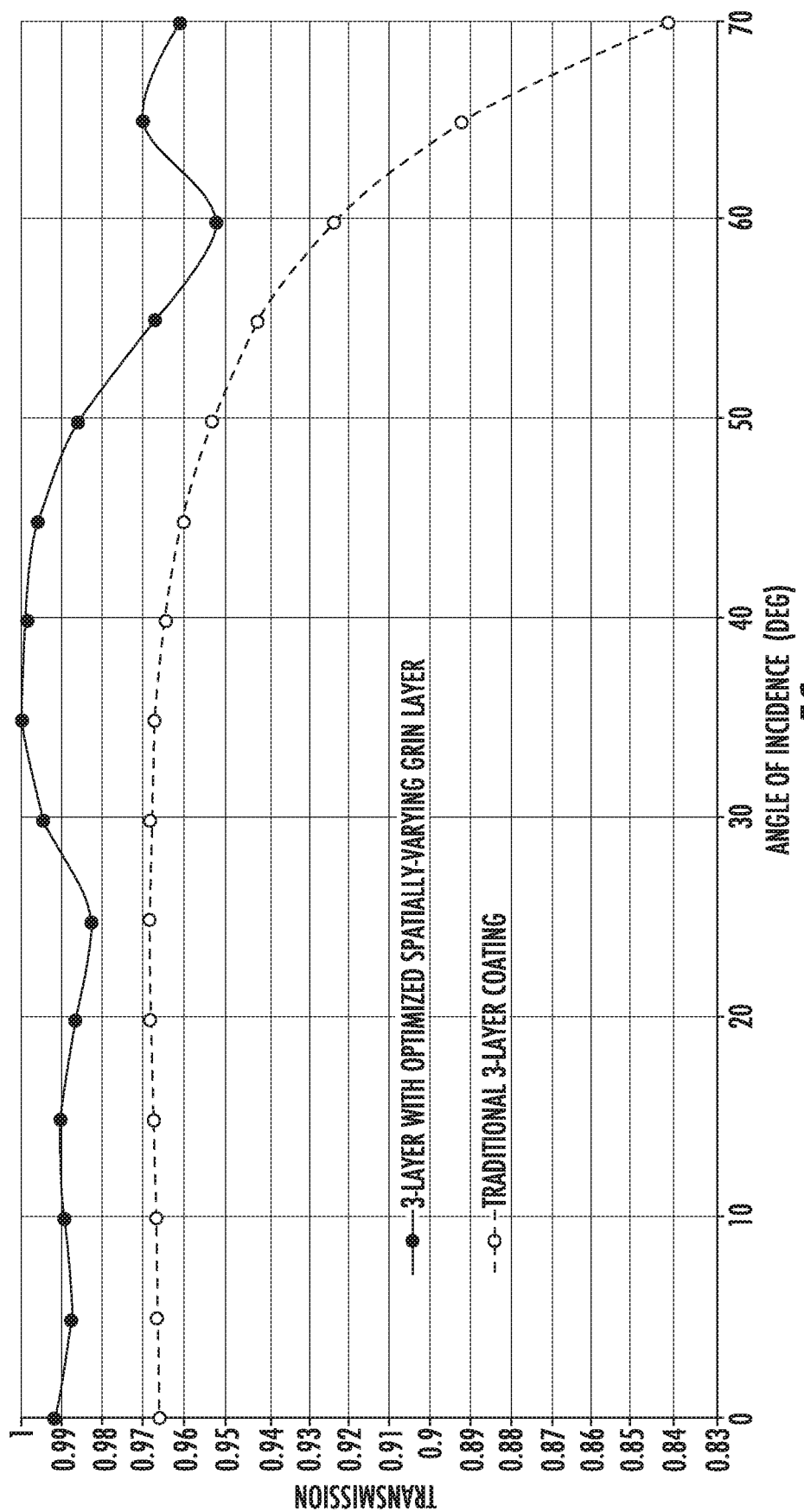
FIG. 5C is a graph illustrating transmission of EMR output as a function of angle of incidence at a particular wavelength comparing an anti-reflective coating with a uniform index of refraction with an anti-reflective coating with differing indices of refraction.

FIG. 5C is a graph illustrating transmission of EMR output as a function of angle of incidence comparing an anti-reflective coating with a uniform index of refraction with an anti-reflective coating with differing indices of refraction, as discussed above. As shown, an optical component with an AR coating with differing indices of refraction has better maximum transmission performance and less of a drop in performance at higher angles of incidence. In certain embodiments, for an optical system that operates with varying AOI (including AOIs greater than 40 degrees), the average improvement may be greater than 5% or even more. For example, in certain embodiments, there is about a 12% improvement in transmission at AOIs of 70 degrees.

Figure 5D:
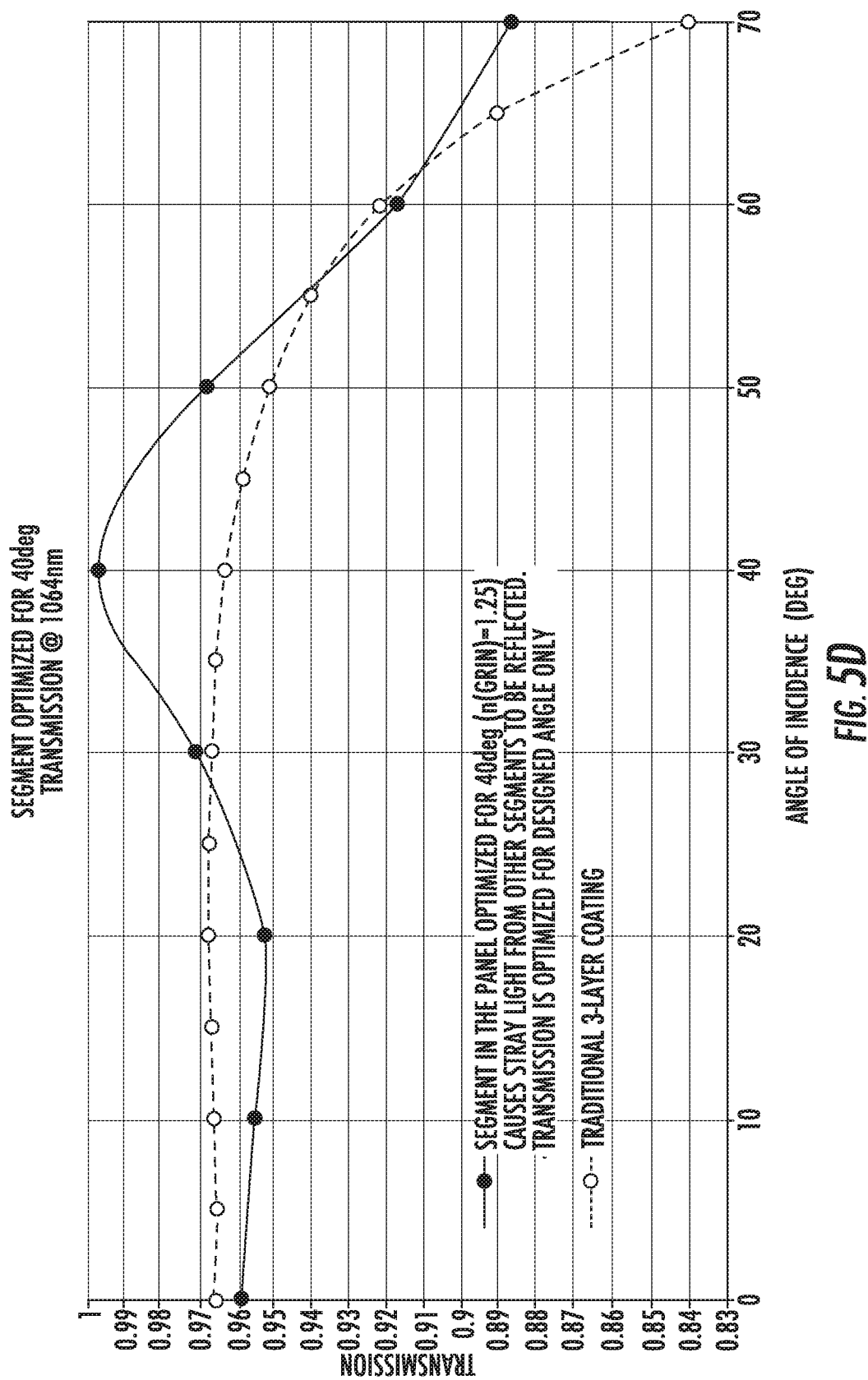
FIG. 5D is a graph illustrating transmission of reflected EMR as a function of angle of incidence at a particular wavelength comparing an anti-reflective coating with a uniform index of refraction with an anti-reflective coating with differing indices of refraction.

FIG. 5D is a graph illustrating transmission of EMR output as a function of angle of incidence comparing an anti-reflective coating with a uniform index of refraction with an anti-reflective coating with differing indices of refraction, as discussed above. In particular, for example, a segment of the optical component optimized for a 40 degree AOI has an increased transmission at 40 degrees (e.g., transmission of 99.98%), but a decreased transmission at other angles of incidence (e.g., by light). Accordingly, the segment is not only better able to transmit EMR emissions therethrough at the intended AOI, but is also better able to block transmission therethrough of reflected EMR (e.g., from adjacent transmissive surfaces). Traditional coatings with a constant index of refraction cannot take this feature into consideration as the stack is optimized for the entire range of AOIs.

Figure 6A:
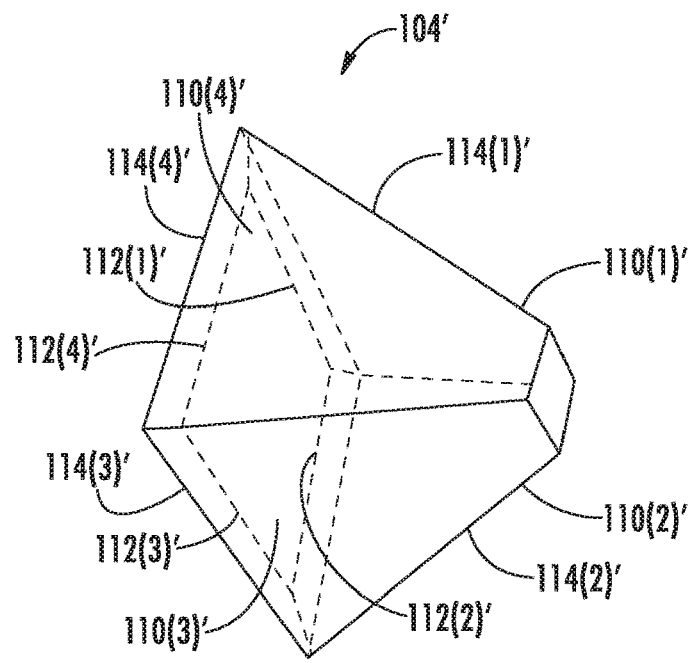
FIG. 6A is a perspective view of another embodiment of the optical component of the optical system of FIGS. 1A-1B with multiple optical segments in a pyramidal shape.

FIG. 6A is a perspective view of another embodiment of the optical assembly 104' with multiple optical components 110(1)'-110(4)' (may also be referred to as optical segments) in a pyramidal shape (e.g., hollow). Of course, other polygonal shapes could be used. In particular, the optical component 110' includes a first optical component 110(1)' including a first inner transmissive surface portion 112(1)' and a first outer transmissive surface portion 114(1)', a second optical component 110(2)' including a second inner transmissive surface portion 112(2)' and a second outer transmissive surface portion 114(2)', a third optical component 110(3)' including a third inner transmissive surface portion 112(3)' and a third outer surface portion 114(3)', and a fourth optical component 110(4)' including a fourth inner transmissive surface portion 112(4)' and a fourth outer transmissive surface portion 114(4)'. Of course, fewer or more optical components may be used. Although the optical assembly 104' is illustrated as hollow, in certain embodiments, the optical assembly 104' may be solid.

Figure 6B:
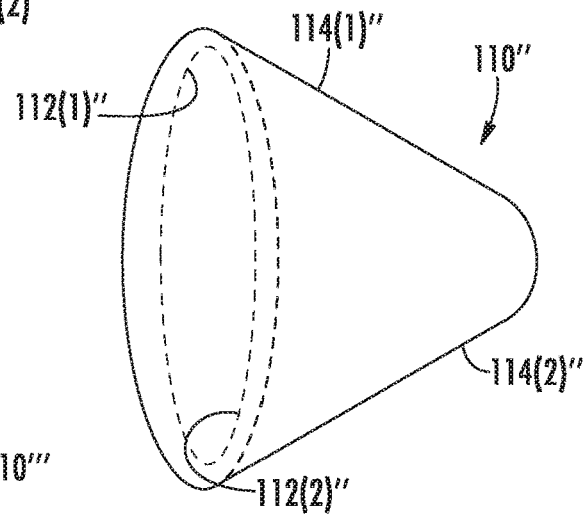
FIG. 6B is a perspective view of another embodiment of the optical component of the optical system of FIGS. 1A-1B as a conformal window in a conical shape.

FIG. 6B is a perspective view of another embodiment of the optical component 110" as a conformal window in a conical shape. Of course, other curved shapes could be used (e.g., ogive, spherical, etc.). The optical component 110" provides one continuous transmissive surface including multiple transmissive surface portions 112(1)", 112(2)", 114(1)", and 114(2)". In particular, for example, the optical component 110" includes a first inner transmissive surface portion 112(1)", a second inner transmissive surface portion 112(2)", a first outer transmissive surface portion 114(1)", and a second outer transmissive surface portion 114(2)". The first inner transmissive surface portion 112(1)" and the second inner transmissive surface portion 112(2)" are integrally connected to each other. Further, the first outer transmissive surface portion 114(1)" and the second outer transmissive surface portion 114(2)" are integrally connected to each other. Although the optical component 110" is illustrated as hollow, in certain embodiments, the optical component 110" may be solid.

Figure 6C:
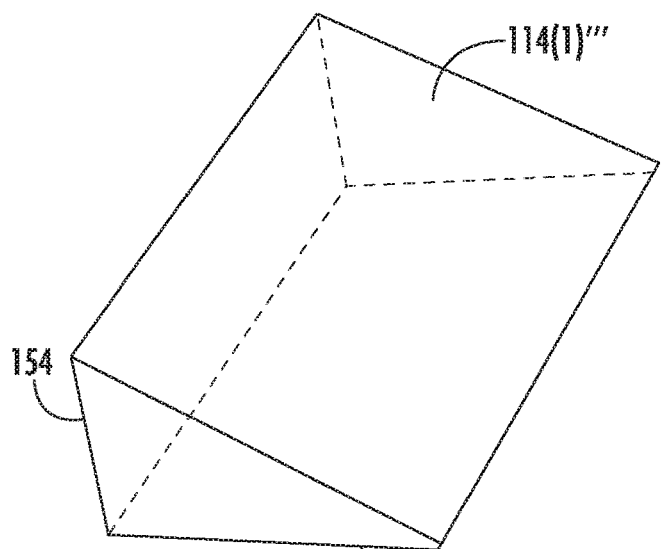
FIG. 6C is a perspective view of another embodiment of the optical system of FIGS. 1A-1B with emission of a cylinder-shaped EMR output via an intermediate reflector and an optical component that is solid with two exterior adjacent transmissive surfaces.

FIG. 6C is a perspective view of another embodiment of the optical component 110''' as a solid (not hollow) optical component. The optical component 110''' includes a first outer transmissive surface portion 114(1)''' and a second outer transmissive surface portion 114(2)'''. In this configuration, light would enter via an entry surface portion 154. The optical component 110''' is solid between the entry surface portion 154 and each of the first outer transmissive surface portion 114(1)''' and the second outer transmissive surface portion 114(2)'''. Of course, fewer or more optical components may be used. Although the optical component 110''' is illustrated as solid, in certain embodiments, the optical component 110''' may be hollow.

Figure 7:
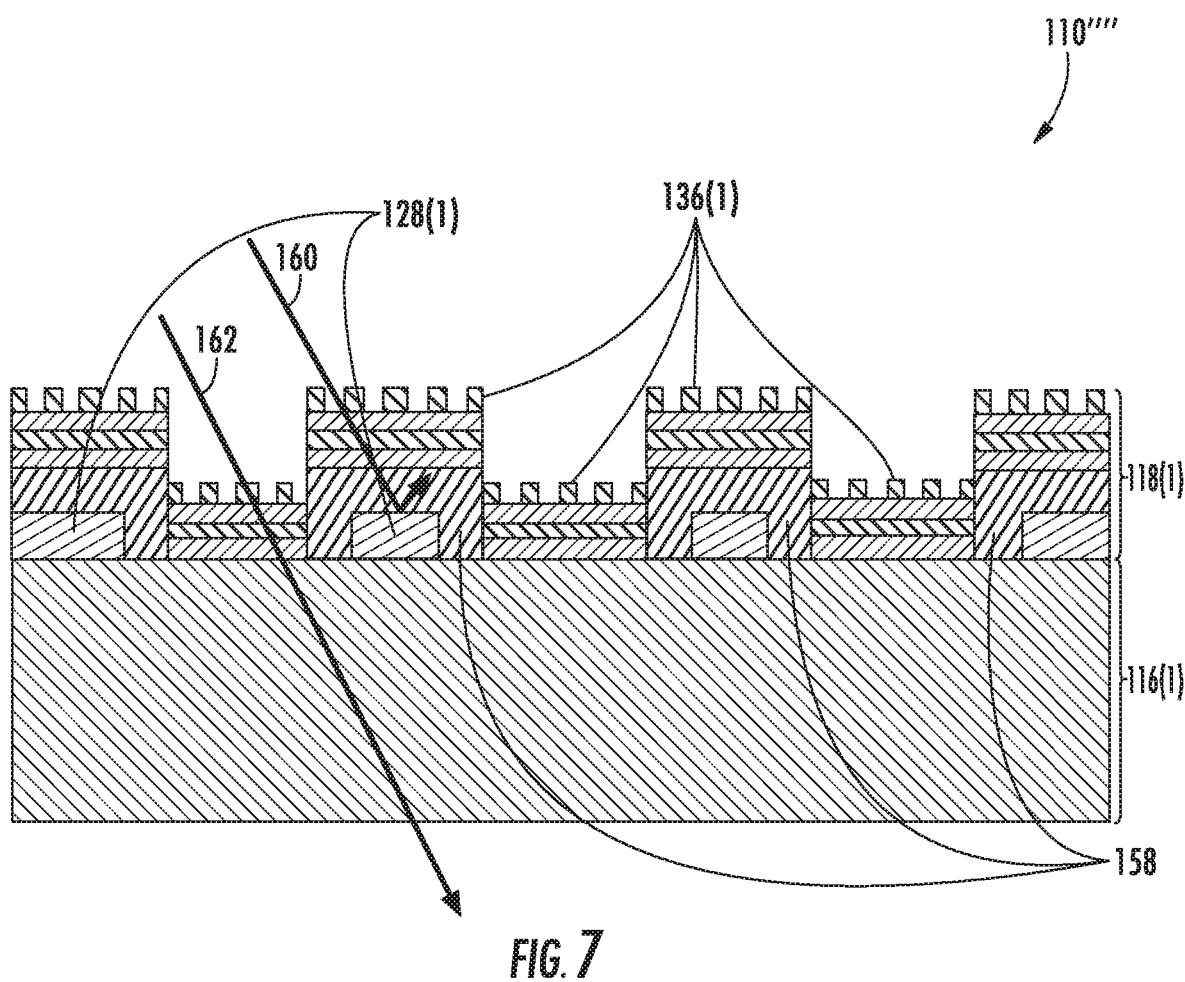
FIG. 7 is a side view of the optical component of FIGS. 1A-1B with a blocking layer covering the reflective layer to block reflections by the reflective layer.

FIG. 7 is a side view of the optical component 110"" with a blocking layer 158 covering the at least one reflective layer 128(1) to block reflections by the at least one reflective layer 128(1). In certain embodiments, the optical component 110"" includes at least one blocking layer 158 proximate the at least one reflective layer 128(1). In particular, the blocking layer 158 surrounds at least a portion of the at least one reflective layer 128(1). In other embodiments, the blocking layer 158 surrounds the at least one reflective layer 128(1) such that the at least one reflective layer 128(1) is completely surrounded by the blocking layer 158 and/or the substrate 116(1). The blocking layer 158 is configured to prevent propagation of any EMR reflected by the at least one reflective layer 128(1). For example, EMR emissions 160 (whether intended or reflected) that enter the blocking layer 158 are not then reflected, while still allowing other EMR emissions 162 to proceed through the AR coating 136(1) and the substrate 116(1). Such a configuration further reduces the chances of any reflections. In certain embodiments, the at least one blocking layer 158 includes an absorptive layer configured to absorb any EMR reflected by the at least one reflective layer. For example, the absorptive layer may include nanocarbon coatings, diamond-like carbon (DLC), etc. In certain embodiments, the at least one blocking layer 158 includes a dispersive layer configured to disperse any EMR reflected by the at least one reflective layer 128(1).

Figure 8:
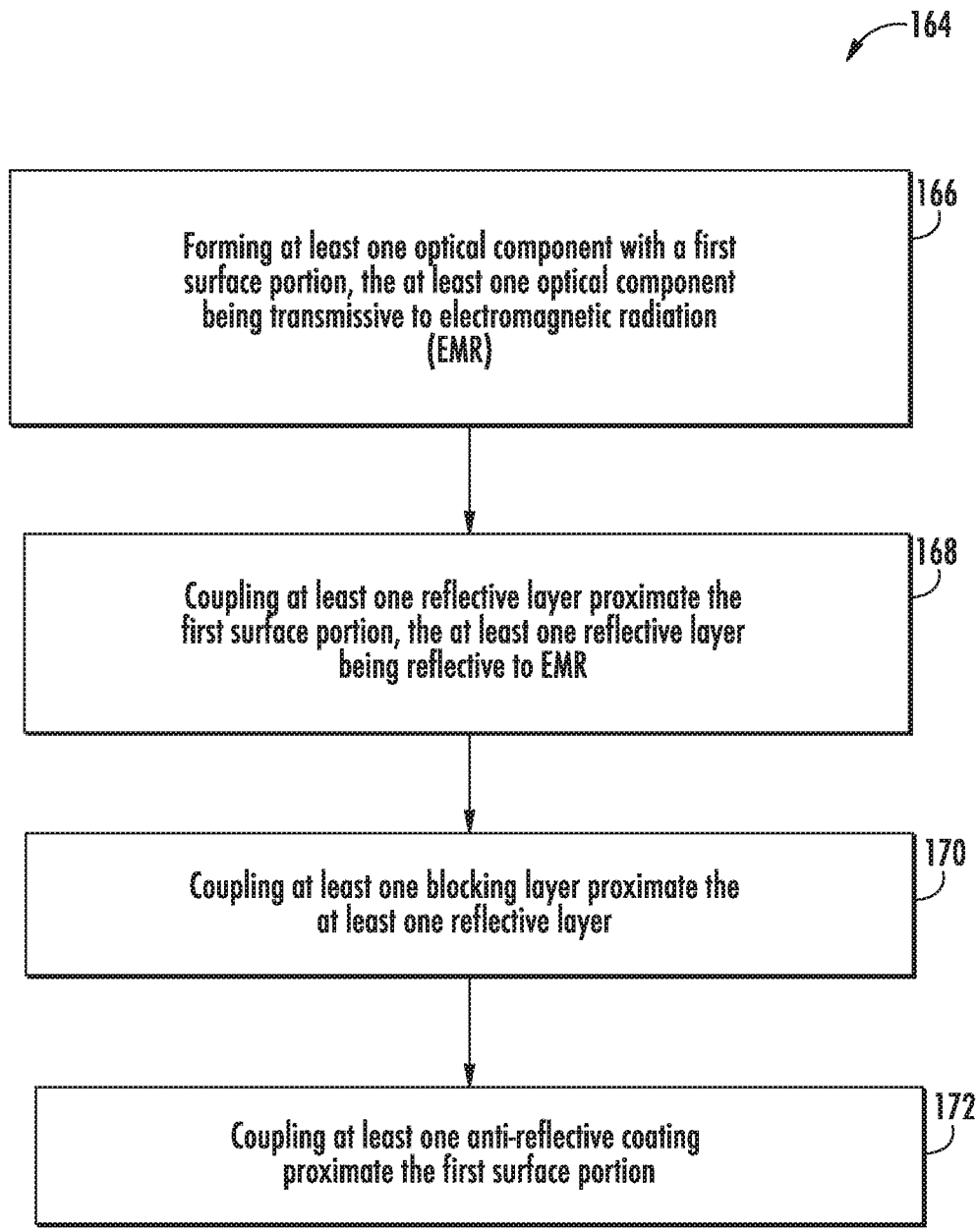
FIG. 8 is a flowchart for making an optical system of FIGS. 1A-7.

FIG. 8 is a flowchart 164 for making an optical system of FIGS. 1A-7. Step 166 includes forming at least one optical component with a first surface portion, the at least one optical component being transmissive to EMR. In certain embodiments, forming the at least one optical component with the first surface portion further comprises forming at least one optical component (e.g., conformal window) with a first surface portion and a second surface portion.

Step 168 includes coupling at least one reflective layer proximate the first surface portion, the at least one reflective layer being reflective to EMR. In certain embodiments, the at least one reflective layer is an electrically conductive grid.

Step 170 includes coupling at least one blocking layer proximate the at least one reflective layer. The at least one blocking layer is configured to prevent propagation of any EMR reflected by the at least one reflective layer. In certain embodiments, the at least one blocking layer includes at least one of an absorptive layer configured to absorb any EMR reflected by the at least one reflective layer, and/or a dispersive layer configured to disperse any EMR reflected by the at least one reflective layer.

Step 172 includes coupling at least one anti-reflective coating proximate the first surface portion. The at least one anti-reflective coating includes a gradient-index (GRIN) layer with differing indices of refraction. Each index of refraction is configured to increase propagation of the EMR at a predetermined angle of incidence to prevent reflection of the EMR from the first surface portion to the second surface portion. In certain embodiments, coupling the at least one anti-reflective coating proximate the first surface portion further comprises coupling a first anti-reflective coating to the first surface portion and coupling a second anti-reflective coating to the second surface portion.

Figure 9:
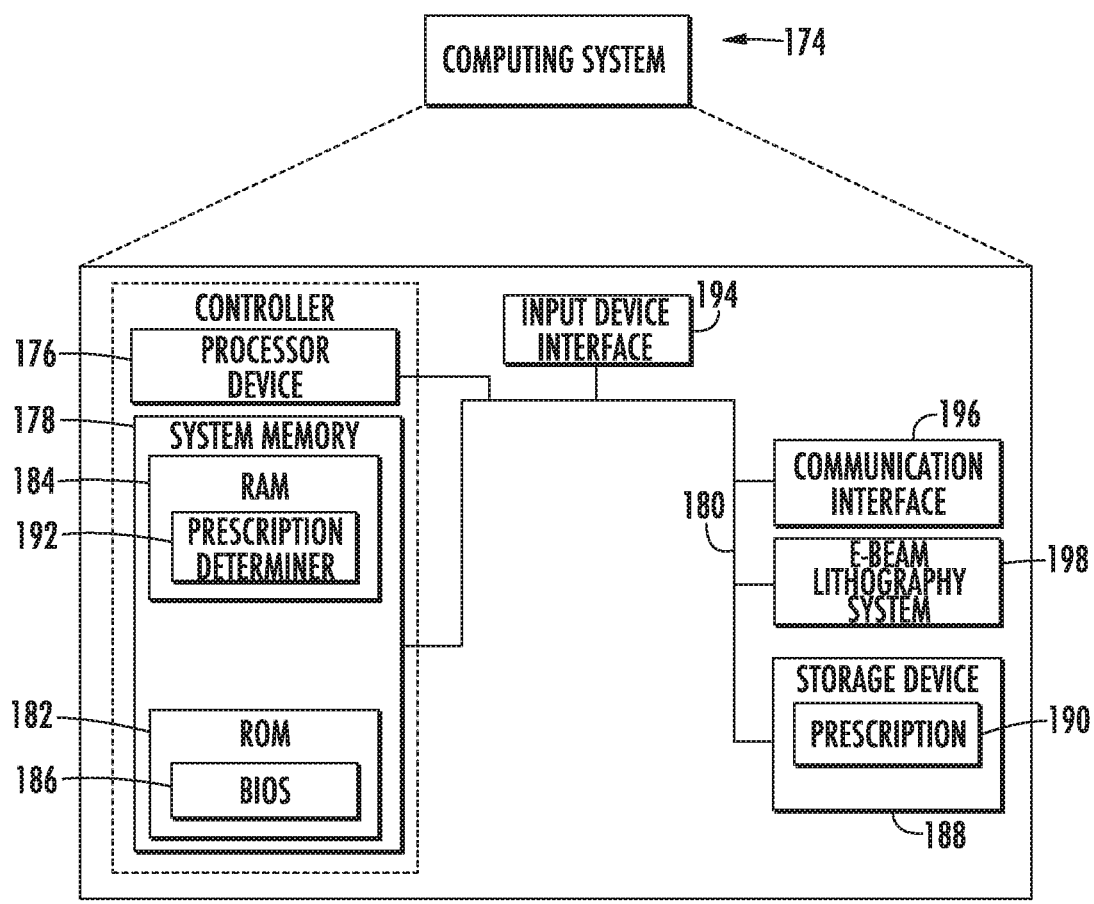
FIG. 9 is a block diagram of a system suitable for customizing the refractive index of a surface according to one embodiment.

FIG. 9 is a block diagram of a system 174 suitable for customizing the refractive index of a surface according to one embodiment. The system 174 may comprise one or more discrete computing devices. The system 174 includes a processor device 176, a system memory 178, and a system bus 180. The system bus 180 provides an interface for system components including, but not limited to, the system memory 178 and the processor device 176. The processor device 176 can be any commercially available or proprietary processor.

The system bus 180 may be any of several types of bus structures that may further interconnect to a memory bus (with or without a memory controller), a peripheral bus, and/or a local bus using any of a variety of commercially available bus architectures. The system memory 178 may include non-volatile memory 182 (e.g., read-only memory (ROM), erasable ROM (EPROM), electrically EPROM (EEPROM), etc.), and volatile memory 184 (e.g., RAM). A basic input/output system (BIOS) 186 may be stored in the non-volatile memory 182 and can include the basic routines that help to transfer information among elements within the system 174. The volatile memory 184 may also include a high-speed RAM, such as static RAM, for caching data.

The system 174 may further include or be coupled to a non-transitory computer-readable storage medium such as a storage device 188, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 188 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. The storage device 188 may contain one or more prescriptions 190 that identify how a surface should be modified. For example, a prescription 190 may identify the particular filling fraction, diameter, and pitch of sub-wavelength openings that should be formed in the surface of an optical component, for each of a plurality of different surface portions of the optical component.

A number of modules can be stored in the storage device 188 and in the volatile memory 184, including a prescription determiner 192 that implements the mechanisms discussed above with respect to FIG. 3A to determine a prescription 190. All or a portion of the examples may be implemented as a computer program product stored on a transitory or non-transitory computer-usable or computer-readable storage medium, such as the storage device 188, which includes complex programming instructions, such as complex computer-readable program code, to cause the processor device 176 to carry out the steps described herein. Thus, the computer-readable program code can comprise software instructions for implementing the functionality of the examples described herein when executed on the processor device 176. The processor device 176 may serve as a controller, or control system, for the system 174 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 176 through an input device interface 194 that is coupled to the system bus 180 but can be connected by other interfaces, such as a parallel port, a serial port, a Universal Serial Bus (USB) port, an IR interface, and the like.

The system 174 may also include a communication interface 196 suitable for communicating with a network as appropriate or desired. The system 174 may also include an e-beam lithography system 198 suitable for accessing a prescription 190 and, in accordance with the prescription 190, form a plurality of sub-wavelength openings in a surface of an optical component to alter one or more portions of the surface from a native refractive index to a desired refractive index.

Those skilled in the art will recognize improvements and modifications to the preferred embodiments of the disclosure. All such improvements and modifications are considered within the scope of the concepts disclosed herein and the claims that follow.

What is claimed is:

1. An optical system, comprising:
   at least one optical component with a first surface portion and a second surface portion angled relative to the first surface portion at a non-zero angle, the at least one optical component being transmissive to electromagnetic radiation (EMR);

at least one reflective layer attached to the first surface portion, the at least one reflective layer being reflective to EMR; and at least one anti-reflective coating attached to the first surface portion, the at least one anti-reflective coating including a gradient-index (GRIN) layer with differing indices of refraction;

wherein each index of refraction is configured to increase propagation of the EMR at a predetermined angle of incidence to prevent reflection of the EMR from the first surface portion to the second surface portion.

2. The optical system of claim 1, wherein the at least one optical component comprises a single optical component with the first surface portion and the second surface portion integrally connected to each other.

3. The optical system of claim 1, wherein the first surface portion and the second surface portion form a conformal window.

4. The optical system of claim 1, wherein the at least one optical component comprises a first optical component comprising the first surface portion and a second optical component comprising the second surface portion.

5. The optical system of claim 1, wherein the at least one optical component comprises a first inner surface comprising the first surface portion such that the EMR enters the at least one optical component via the first inner surface.

6. The optical system of claim 1, wherein the at least one optical component comprises a first outer surface comprising the first surface portion such that the EMR exits the at least one optical component via the first outer surface.

7. The optical system of claim 1, wherein the at least one reflective layer forms a plurality of apertures therein.

8. The optical system of claim 1, wherein the at least one reflective layer is an electrically conductive grid.

9. The optical system of claim 1, wherein:
the first surface portion comprises a first inner surface portion;
the first surface portion further comprises a first outer surface portion; and
the at least one reflective layer comprises a first inner reflective layer attached to the first inner surface portion and a first outer reflective layer attached to the first outer surface portion.

10. The optical system of claim 1, wherein the at least one reflective layer is also attached to the second surface portion; and the at least one anti-reflective coating is also attached to the second surface portion and the at least one reflective layer.

11. The optical system of claim 1, wherein the EMR comprises laser radiation.

12. The optical system of claim 1, further comprising at least one blocking layer proximate the at least one reflective layer, the at least one blocking layer configured to prevent propagation of any EMR reflected by the at least one reflective layer.

13. The optical system of claim 12, wherein the at least one blocking layer comprises an absorptive layer configured to absorb any EMR reflected by the at least one reflective layer.

14. The optical system of claim 12, wherein the at least one blocking layer comprises a dispersive layer configured to disperse any EMR reflected by the at least one reflective layer.

15. A method of making an optical system, comprising:
forming at least one optical component with a first surface portion and a second surface portion angled relative to the first surface portion at a non-zero angle, the at least one optical component being transmissive to electromagnetic radiation (EMR);

coupling at least one reflective layer to the first surface portion, the at least one reflective layer being reflective to EMR; and coupling at least one anti-reflective coating to the first surface portion, the at least one anti-reflective coating including a gradient-index (GRIN) layer with differing indices of refraction, each index of refraction configured to increase propagation of the EMR at a predetermined angle of incidence to prevent reflection of the EMR from the first surface portion to the second surface portion.

16. The method of claim 15, wherein the at least one reflective layer is electrically conductive.

17. The method of claim 15,
wherein forming the at least one optical component further comprises forming a conformal window with the first surface portion and the second surface portion; and wherein coupling the at least one anti-reflective coating to the first surface portion further comprises coupling a first anti-reflective coating to the first surface portion and coupling a second anti-reflective coating to the second surface portion.

18. The method of claim 17,
wherein coupling the at least one reflective layer to the first surface portion further comprises coupling a first reflective layer to the first surface portion and coupling a second reflective layer to the second surface portion.

19. The method of claim 15, further comprising coupling at least one blocking layer proximate the at least one reflective layer, the at least one blocking layer configured to prevent propagation of any EMR reflected by the at least one reflective layer.

20. The method of claim 19, wherein the at least one blocking layer comprises at least one of:
an absorptive layer configured to absorb any EMR reflected by the at least one reflective layer; or
a dispersive layer configured to disperse any EMR reflected by the at least one reflective layer.

* * * * *